United States Patent [19]

Abolins et al.

[11] Patent Number: 4,504,613

[45] Date of Patent: Mar. 12, 1985

[54] POLYPHENYLENE ETHER RESIN COMPOSITIONS HAVING IMPROVED DUCTILE IMPACT STRENGTH

[75] Inventors: Visvaldis Abolins, Delmar; Fred F. Holub, Schenectady, both of N.Y.

[73] Assignee: General Electric Company, Pittsfield, Mass.

[21] Appl. No.: 524,824

[22] Filed: Aug. 19, 1983

[51] Int. Cl.³ .......................... C08K 5/53; C08L 71/04
[52] U.S. Cl. ................................. 524/125; 524/126; 524/141; 524/311; 524/314; 524/420; 524/432; 524/497; 525/68
[58] Field of Search ............... 524/125, 126, 311, 399, 524/420, 432, 497, 314; 525/132, 133, 151, 152, 391, 397, 68

[56] References Cited

U.S. PATENT DOCUMENTS

| | | | |
|---|---|---|---|
| 3,956,423 | 5/1976 | Katchman | 524/420 |
| 4,073,765 | 2/1978 | Katchman et al. | 524/311 |
| 4,206,154 | 6/1980 | Lee, Jr. et al. | 524/132 |
| 4,373,045 | 2/1983 | Cooper et al. | 524/141 |
| 4,419,478 | 12/1983 | Brandstetter et al. | 524/311 |

FOREIGN PATENT DOCUMENTS 2043083  10/1980  United Kingdom .

*Primary Examiner*—John Kight
*Assistant Examiner*—Kriellion Morgan
*Attorney, Agent, or Firm*—Hedman, Gibson, Costigan & Hoare

[57] ABSTRACT

The ductile impact strength and tensile elongation of flame retardant compositions of a polyphenylene ether resin and a poly(alkenyl aromatic) are upgraded by the addition of only small amounts, typically from about 0.1 to about 10 parts by weight, of high molecular weight polyfunctional esters or low molecular weight saturated polyesters.

28 Claims, No Drawings

POLYPHENYLENE ETHER RESIN COMPOSITIONS HAVING IMPROVED DUCTILE IMPACT STRENGTH

BACKGROUND OF THE INVENTION

The polyphenylene ether resins are known to be combinable with alkenyl aromatic polymers to provide thermoplastic compositions which are extrudable and moldable into articles of high heat resistance, good impact strength and hydrolytic stability, and good dimensional stability. The compositions can also be formulated into various types, including flame retardant, reinforced, platable, or foamable grades.

The polyphenylene ether resins and methods of their formation are described in the patent literature, including U.S. Pat. Nos. 3,306,874 and 3,306,875 (Hay), and U.S. Pat. Nos. 3,257,357 and 3,257,358 (Stamatoff). A mixture of polyphenylene ether resin with poly(alkenyl aromatics), including polystyrene, rubber modified polystyrene and styrenic co-and terpolymers, is disclosed by Cizek in U.S. Pat. No. 3,383,435.

Compositions of polyphenylene ether resin and styrene resins have been further modified to improve certain properties by the addition of polyesters. Lee, Jr., et al. in U.S. Pat. No. 4,206,154 disclose that the use of a fatty acid-terminated saturated polyester in combination with a polyphenylene ether resin, a styrene resin, a halogenated aromatic flame retardant and ferrocene, results in a composition having enhanced thermal resistance, improved impact strength, and less tendency to undergo dripping when molten. Katchman, et al. in U.S. Pat. No. 4,073,765 disclose that the inclusion of an adipic acid based polyester to an admixture of polyphenylene ether resin, styrene resin and titanate filler, enhances the impact strength and tensile elongation.

INTRODUCTION TO THE INVENTION

It has now been discovered that a minor, even a very small amount of (1) a relatively high molecular weight polyfunctional ester of an aliphatic carboxylic acid and a branched polyol, or (2) a relatively low molecular weight saturated polyester of an aliphatic diol and a dicarboxylic acid, or (3) a mixture of the two, when included in flame retardant admixtures and blends of a polyphenylene ether resin, a poly(alkenyl aromatic) and a non-halogenated aromatic phosphate flame retardant agent, sharply increases the ductile impact strength as well as the tensile elongation of articles extruded or molded from the composition. For instance, the articles often possess a ductile impact strength as measured by the Gardner test of greater than 200 in. lbs., in comparison with less than 200 in. lbs. for the corresponding composition without the additive(s). Moreover, the heat distortion temperature is maintained, and the composition remains flame retardant.

DESCRIPTION OF THE INVENTION

The invention may be practiced with use of a wide variety of materials encompassed within the broader description given above. In the typical case, however, use is made of certain preferred materials which are described below.

The polyphenylene ether resin, which may be designated component (a) of the composition, is normally a homo- or copolymer having units of the formula

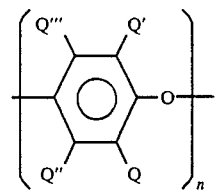

wherein Q, Q', Q" and Q''' are independently selected from the group consisting of hydrogen, halogen, hydrocarbon, halohydrocarbon, hydrocarbonoxy, and halohydrocarbonoxy; and n represents the total number of monomer units and is an integer of at least about 20, and more usually at least 50.

The polyphenylene ether resin can be prepared in accordance with known procedures, such as those described in the above mentioned patents of Hay and Stamatoff, from the reaction of phenols including but not limited to: 2,6-dimethylphenol; 2,6-diethylphenol; 2,6-dibutylphenol; 2,6-dilaurylphenol; 2,6-dipropylphenol; 2,6-diphenylphenol; 2-methyl-6-tolylphenol; 2-methyl-6-methoxyphenol; 2-methyl-6-butylphenol; 2,6-dimethoxyphenol; 2,3,6-trimethylphenol; 2,3,5,6-tetramethylphenol, and 2,6-diethoxyphenol.

Each of these may be reacted alone to produce the corresponding homopolymer, or in pairs or with still other phenols to produce the corresponding copolymer. Examples of the homopolymer include poly(2,6-dimethyl-1,4-phenylene ether), poly(2,6-diethyl-1,4-phenylene ether), poly(2,6-dibutyl-1,4-phenylene ether), poly(2,6-dilauryl-1,4-phenylene ether), poly(2,6-dipropyl-1,4-phenylene ether), poly(2,6-diphenyl-1,4-phenylene ether), poly(2-methyl-6-tolyl-1,4-phenylene ether), poly(2-methyl-6-methoxy-1,4-phenylene ether), poly(2-methyl-6-butyl-1,4-phenylene ether), poly(2,6-dimethoxy-1,4-phenylene ether), poly(2,3,6-trimethyl-1,4-phenylene ether), poly(2,3,5,6-tetramethyl-1,4-phenylene ether), and poly(2,6-diethoxy-1,4-phenylene ether). Examples of the copolymer include, especially, those of 2,6-dimethylphenol with other phenols, such as poly(2,6-dimethyl-co-2,3,6-trimethyl-1,4-phenylene ether) and poly(2,6-dimethyl-co-2-methyl-6-butyl-1,4-phenylene ether).

For purposes of the present invention, an especially preferred family of polyphenylene ethers include those having alkyl substitution in the two positions ortho to the oxygen ether atom, i.e., those of the above formula wherein Q and Q' are alkyl, most preferably having from 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene ether; poly(2,6-dipropyl-1,4-phenylene)ether; poly(2-ethyl-6-propyl-1,4-phenylene)ether; and the like.

The most preferred polyphenylene ether resin for purposes of the present invention is poly(2,6-dimethyl-1,4-phenylene)ether.

Component (b) of the composition is an alkenyl aromatic polymer. The term "alkenyl aromatic polymer" as it is employed in this disclosure is intended to encompass homopolymers, as well as rubber modified high impact varieties, and also copolymers and terpolymers of alkenyl aromatic compounds with one or more other materials. Preferably, the alkenyl aromatic polymer is based at least in part on units of the formula

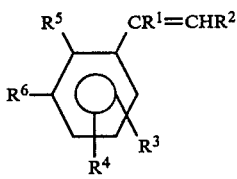

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms; or $R^5$ or $R^6$ may be concatenated together with hydrocarbyl groups to form a naphthyl group.

The above will encompass styrene, as well as homologs and analogs of styrene. Specific examples include, in addition to styrene, chlorostyrene, bromostyrene, alpha-methyl styrene, para-methyl styrene, vinyl styrene, divinylbenzene and vinyl naphthalene. Styrene is especially preferred.

By way of illustration, component (b) can be a polystyrene or other alkenyl aromatic homopolymer which has been modified by admixture or interreaction with a natural or synthetic rubber, for example, polybutadiene, polyisoprene, EPDM rubber or silicone rubber; or it can be a copolymer or terpolymer of styrene or other alkenyl aromatic compound with an elastomeric or other material, such as a block copolymer of styrene and butadiene (for example, AB, ABA, ABAB or ABABA type), including hydrogenated forms of the foregoing, a radial teleblock copolymer of styrene, butadiene and a coupling agent, including hydrogenated forms, terpolymers of acrylonitrile, styrene and butadiene (ABS), styrene-acrylonitrile copolymers (SAN), and a copolymer of styrene and maleic anhydride; or it can also be an alkenyl aromatic copolymer or terpolymer which has been modified with rubber, for example, rubber modified styrene-maleic anhydride copolymer. Many of them are described in the patent literature, including the Cizek patent mentioned above.

The ductile strength improving additive, designated herein also as component(c), is (1) a high molecular weight polyfunctional ester of an aliphatic carboxylic acid and a branched polyol (that is, a di- or polyhydric alcohol), or (2) a low molecular weight saturated polyester, or a mixture of both.

The ester, component (c) (1), is a polyfunctional compound having two or more ester groups, is relatively non-volatile at temperatures of about 100° C., and in general has a molecular weight (weight average) in the range from about 300 to about 2000.

Suitable polyfunctional esters include those derived from aliphatic carboxylic acid of from 2 to about 20 carbon atoms and branched polyols containing from 2 to 4 hydroxyl groups.

Examples of carboxylic acids from which the polyfunctional ester may be prepared are acetic ($C_2$), propionic ($C_3$), butyric ($C_4$), valeric ($C_5$), caproic ($C_6$), caprylic ($C_8$), capric ($C_{10}$), lauric ($C_{12}$), myristic ($C_{14}$), palmitic ($C_{16}$), stearic ($C_{18}$) and docosanoic acid ($C_{22}$).

Examples of branched polyols which may be interreacted with the foregoing to form the polyfunctional ester include, especially, pentaerythritol (having four hydroxyl groups), and pinacol (having two hydroxyl groups).

The ester may be prepared in the conventional way such as by heating the carboxylic acid or a derivative such as the acid chloride or anhydride with the polyol in the presence of an amount of a mineral acid, for example, concentrated sulfuric or hydrochloric.

The polyester, component (c) (2), is a saturated polymer preferably having a weight average molecular weight within the range from about 500 to about 10,000. The polymer is based on aliphatic diols having from 2 to 10 carbon atoms, straight or branched in structure, but preferably branched, and aliphatic dicarboxylic acids having from 2 to 20 carbon atoms.

Examples of diols useful in the preparation of the polyester include 1,2-ethanediol, 1,2-propanediol, 1,3-butanediol, 2,3-butanediol, 1,4-butanediol, 1,5-butanediol, 2,2-dimethyl-1,3-propanediol (neopentyldiol), 1,3-hexanediol and 1,6-hexanediol.

Examples of dicarboxylic acids are oxalic, malonic, succinic, glutaric, adipic, pimelic, suberic, azelaic and sebacic.

The polyester can be prepared by use of standard techniques known to those skilled in the art. In one procedure, involving direct esterification, the diacid and an excess amount of the diol are heated with stirring in a glass lined or stainless steel reaction vessel, at a temperature of 150° to 250° C. in the presence of an inert gas, for example, nitrogen. The polyesterification is initially self-catalyzing, due to the presence of the carboxyl groups on the diacid. As the reaction progresses, and as the amount of the diacid is correspondingly reduced, it may be helpful to include a catalyst to maintain the reaction rate. During the reaction, by-product water and unreacted portions of the diol are distilled off. The progression of the reaction may be monitored by measuring the volume of distillate, or the number of end groups, or the viscosity of samples drawn from the reaction mixture. Care should be taken to avoid extended periods of heating, the use of very high temperatures, or the application of reduced pressure (vacuum), all of which may promote further polymerization to undesirably high molecular weights. Further, details are available in the Encyclopedia of Polymer Science and Technology, John Wiley and Sons, Inc., Volume 11, pages 88-97 (1964).

The composition of the invention will also contain as an essential ingredient a flame retardant agent, component (d), which is a non-halogen containing organic phosphate. In the preferred embodiments, the organic phosphate is a compound having the formula

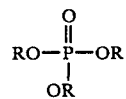

where R is the same or different and is alkyl, cycloalkyl, aryl, alkyl substituted aryl, aryl substituted alkyl, or a combination of any of the foregoing, provided at least one R is aryl.

Examples include phenyl bisdodecyl phosphate, phenylbisneopentyl phosphate, phenyl-bis(3,5,5'-trimethylhexyl phosphate), ethyldiphenyl phosphate, 2-ethylhexyldi(p-tolyl) phosphate, bis-(2-ethylhexyl)p-tolylphosphate, tritolyl phosphate, bis-(2-ethylhexyl) phenyl phosphate, tri-(nonylphenyl) phosphate, di(dodecyl)p- tolyl phosphate, tri-cresyl phosphate, triphenyl phosphate, dibutylphenyl phosphate, 2-chloroethyldiphenyl phosphate, p-tolyl bis(2,5,5'-trimethylhexyl) phosphate, 2-ethylhexyldiphenyl) phosphate, and the like. The preferred phosphates are those in which each R is aryl. Especially preferred is triphenyl phosphate, which may be either unsubstituted or substituted with alkyl, for example, isopropylated triphenyl phosphate.

The organic phosphate can also be a difunctional or polyfunctional aromatic compound or polymer of the following formulae:

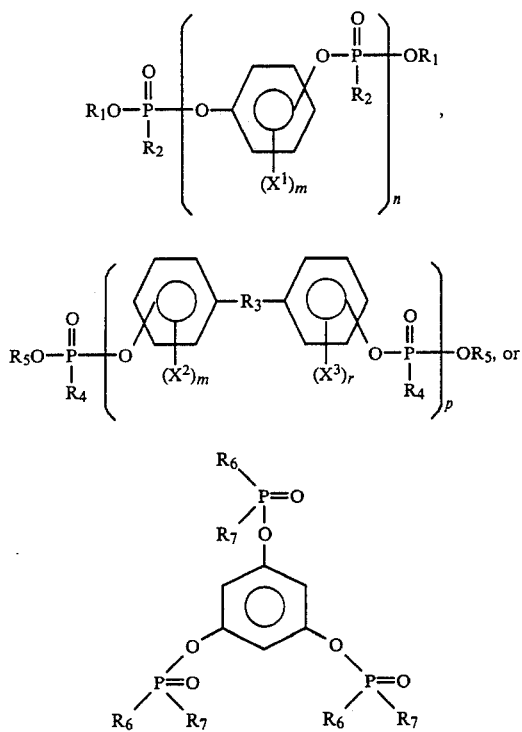

in which $R_1$, $R_3$ and $R_5$ are, independently, hydrocarbon; $R_2$, $R_4$, $R_6$ and $R_7$ are, independently, hydrocarbon or hydrocarbonoxy; $X^1$, $X^2$ and $X^3$ are halogen; m and r are 0 or integers from 1 to 4, and n and p are from 1 to 30.

Methods of preparation are described in British Pat. No. 2,043,083.

Particular mention is made herein of the bis diphenyl phosphates of resorcinol, hydroquinone and bisphenol-A, respectively, and of their oligomeric and polymeric counterparts.

The polyphenylene ether resin and alkenyl aromatic polymer, components (a) and (b), are admixable in widely variant proportion ranging from, for example, 1:99 to 99:1, but more usually from 5:95 to 95:5, and especially preferably from 20:80 to 80:20, weight ratio. Component (c) need only be added in amounts less than about 50 parts by weight, per 100 parts of (a) and (b) together, to get the described benefits. Typically, only small amounts are employed, and preferably from about 0.1 to about 10 parts by weight for each 100 parts of (a) and (b) combined.

The flame retardant, component (d), is present in amounts conventional for the stated purpose, and generally from about 1 to about 20 parts per 100 parts of (a) and (b) combined.

The components which have been described are further admixable with additional ingredients, if desired, which may be selected from among additives such as stabilizers, for example, metal oxides and sulfides; plasticizers; colorants; mineral fillers, for example, clay, talc, mica, or titanium dioxide; reinforcements, for example, glass flakes, fibers or spheres, or titanate whiskers; melt viscosity adjusters, and so forth. These materials may be added in amounts conventional for the desired purpose and as suited for particular requirements.

After preparation, the compositions can be shaped by extrusion, compression or injection molding, sheeting or other thermal procedures into various articles.

In one procedure, a mixture of the ingredients is extruded at a temperature in the range between 550° to 600° F. and injection molded at 500° to 550° F. The resulting molded articles have good ductility and are especially useful in applications where they must withstand rough handling.

The compositions are suitable for any of the widely divergent uses for which polyphenylene ether resin blends are known. Thus, they are utilizable for automotive exteriors, including grilles, headlamp bezels, wheelcovers and decorative trim; automotive interiors, such as pillar and garnish moldings, center consoles, rear window shelves, and speaker and defogger grilles; automotive instrument panel light clusters, lamp housings, electrical connectors and lamp sockets; major household appliances, such as laundry and dishwasher consoles and lids, motor support housings, drain impellers, ice maker components, compressor covers and air conditioning grilles and fans; small appliances such as coffee makers, irons, food processors, hairsetters, curling irons and shower massages; business machine components, including housings, circuit board brackets, card guides and frames, motor covers, connectors, ductworks and control boxes; electrical construction products, including bus-bar sleeves, electrical cable covers, wiring splice covers, track light insulation and lighting enclosures; and television backs, bases, front/escutcheons and cabinet sides.

DESCRIPTION OF THE SPECIFIC EMBODIMENTS

The following examples illustrate the invention and benefits which are achieved.

EXAMPLES 1-3

Compositions in accordance with the invention were prepared by mixing the ingredients noted below in a blender, extruding the blend through a Werner-Pfleiderer twin screw extruder at a temperature of about 550° F., collecting, cooling and chopping the extrudate into molding pellets, and then injection molding the pellets into test bars using a Newbury injection molding device and an injection temperature of about 500° F. A control blend was included for purposes of comparison. The compositions and the test results are set forth in the Table below.

TABLE

| Ingredients, pts. by wt. | A* | 1 | 2 | 3 |
|---|---|---|---|---|
| Poly(2,6-dimethyl-1,4-phenylene ether) resin | 55 | 55 | 55 | 55 |
| Rubber modified high impact polystyrene | 45 | 45 | 45 | 45 |
| Triphenyl phosphate | 17 | 17 | 17 | 17 |
| Titanium dioxide | 5 | 5 | 5 | 5 |
| Tridecylphosphite (stabilizer) | 0.5 | 0.5 | 0.5 | 0.5 |

| Ingredients, pts. by wt. | A* | 1 | 2 | 3 |
|---|---|---|---|---|
| Zinc sulfide/zinc oxide | 0.15/0.15 | 0.15/0.15 | 0.15/0.15 | 0.15/0.15 |
| Poly(neopentyl adipate) | — | 1.0 | — | — |
| Pentaerythritol tetrastearate | — | — | 1.0 | 3.0 |
| Properties | | | | |
| Tensile strength, psi | 8,000 | 8,300 | 8,200 | 7,800 |
| Elongation, % | 58 | 76 | 88 | 92 |
| Gardner imp. str., in.-lbs. | 180 | 400+ | 230 | 400+ |
| Heat distortion temp., °F./264 psi | 192 | 186 | 184 | 180 |

*comparison (control) experiment

All of the above mentioned patents are incorporated herein by reference.

As will occur to those skilled in the art, modifications and variations of the invention are possible in light of the above disclosure. For instance, instead of poly(2,6-dimethyl-1,4-phenylene ether) a copolymer such as poly(2,6-dimethyl-co-2,3,6-trimethyl-1,4-phenylene ether) can be employed. Instead of a rubber modified high impact polystyrene, other alkenyl aromatic polymers can be used, such as linear block or radial teleblock copolymers of styrene and butadiene (Shell Chemical's Kraton® and Kraton® G materials or Phillips Petroleum's Solprene® products). Instead of triphenyl phosphate, a substituted derivative such as isopropylated triphenyl phosphate is possible. Mineral, e.g., clay filled or glass reinforced enbodiments are also possible. Other non-halogenated flame retardant agents in addition to the organic phosphate can be present to enhance the flame retardancy effect. It should be understood, therefore, that changes may be made in the specific embodiments shown which are still within the scope of the invention defined in the appended claims.

We claim:

1. A flame retardant thermoplastic composition, comprising
   (a) a polyphenylene ether resin;
   (b) an alkenyl aromatic polymer;
   (c) a ductile impact strength improving amount of an additive selected from the group consisting of
      (1) a high molecular weight polyfunctional ester,
      (2) a low molecular weight saturated polyneopentyl polyester, and
      (3) a mixture of (1) and (2); and
   (d) an effective amount of a non-halogenated flame retardant agent comprising an organic phosphate.

2. A composition according to claim 1, in which the polyphenylene ether resin is a homopolymer or copolymer having units of the formula

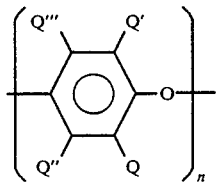

wherein Q, Q', Q'' and Q''' are independently selected from the group consisting of hydrogen, halogen, hydrocarbon, halohydrocarbon, hydrocarbonoxy, and halohydrocarbonoxy; and n represents the total number of monomer units and is an integer of at least about 20.

3. A composition according to claim 1, in which the polyphenylene ether resin is poly(2,6-dimethyl-1,4-phenylene ether) resin.

4. A composition according to claim 1, in which the alkenyl aromatic polymer is a homopolymer, a copolymer, a terpolymer, or a rubber modified version of any of the foregoing.

5. A composition according to claim 1, in which the alkenyl aromatic polymer is derived at least in part from a compound of the formula

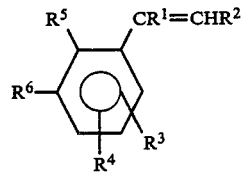

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms; or $R^5$ or $R^6$ may be concatenated together with hydrocarbyl groups to form a naphthyl group.

6. A composition according to claim 1, in which the alkenyl aromatic polymer is a rubber modified high impact polystyrene.

7. A composition according to claim 1, in which component (c) is (1) a high molecular weight polyfunctional ester.

8. A composition according to claim 7, in which (c) (1) has a molecular weight (weight average) in the range from about 300 to about 2000.

9. A composition according to claim 7, in which (c) (1) is derived from an aliphatic carboxylic acid of from 2 to about 20 carbon atoms and a branched polyol of from 2 to 4 hydroxyl groups.

10. A composition according to claim 7, in which (c) (1) is pentaerythritol tetrastearate.

11. A composition according to claim 1, in which component (c) is a low molecular weight saturated polyneopentyl polyester.

12. A composition according to claim 11, in which (c) (2) has a molecular weight (weight average) in the range from about 500 to about 10,000.

13. A composition according to claim 11, in which (c) (2) is based on a diol having from 2 to 10 carbon atoms and an aliphatic dicarboxylic acid having from 2 to 20 carbon atoms.

14. A composition according to claim 11, in which (c) (2) is poly(neopentyl adipate).

15. A composition according to claim 1, in which component (d) is a non-halogenated aromatic compound having the formula

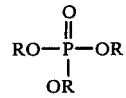

where R is the same or different and is alkyl, cycloalkyl, aryl, alkyl substituted aryl, aryl substituted alkyl, or a combination of any of the foregoing, provided at least one R is aryl.

16. A composition according to claim 15, in which (d) is triphenyl phosphate.

17. A composition according to claim 1, in which component (d) is a non-halogenated difunctional or polyfunctional compound or polymer of the formula

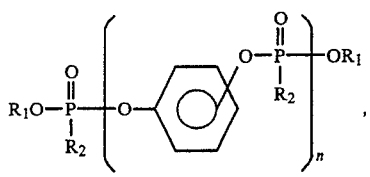

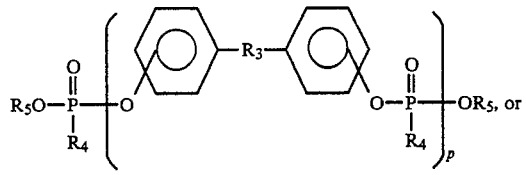

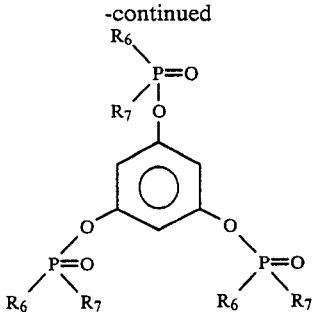

in which $R_1$, $R_3$ and $R_5$ are, independently, hydrocarbon; $R_2$, $R_4$, $R_6$ and $R_7$ are, independently, hydrocarbon or hydrocarbonoxy; and n and p are from 1 to 30.

18. A composition according to claim 17, in which (d) is a bis diphenyl phosphate of resorcinol, hydroquinone or bisphenol-A.

19. A composition according to claim 1, in which the weight ratio of (a):(b) is from 5:95 to 95:5.

20. A composition according to claim 1, in which the weight ratio of (a):(b) is from 20:80 to 80:20.

21. A composition according to claim 1, which contains from about 0.1 to about 10 parts by weight of (c) for each 100 parts of (a) and (b) combined.

22. A composition according to claim 1, which contains from about 1 to about 20 parts of (d) per 100 parts of (a) and (b) combined.

23. A composition according to claim 1, which contains a filler.

24. A composition according to claim 23, in which the filler is non-reinforcing.

25. A composition according to claim 24, in which the non-reinforcing filler is titanium dioxide.

26. A composition according to claim 1, which contains an effective amount of a stabilizer.

27. A composition according to claim 26, in which the stabilizer comprises a combination of zinc sulfide and zinc oxide.

28. A composition according to claim 1, which after molding is characterized by a tensile elongation of not less than 70 percent, and a ductile impact strength of not less than 200 inch-pounds as measured on a Gardner test apparatus.

* * * * *

UNITED STATES PATENT AND TRADEMARK OFFICE
CERTIFICATE OF CORRECTION

PATENT NO. : 4,504,613
DATED : May 12, 1985
INVENTOR(S) : Visvaldis Abolins and Fred F. Holub It is certified that error appears in the above—identified patent and that said Letters Patent is hereby corrected as shown below:

In column 9, on lines 37-43, the formula should read as follows:

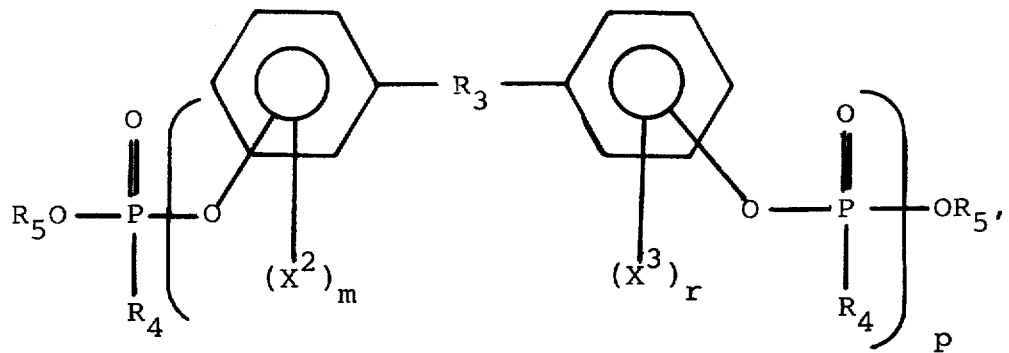

Signed and Sealed this

Third Day of September 1985

[SEAL]

Attest:

DONALD J. QUIGG

*Attesting Officer*     *Acting Commissioner of Patents and Trademarks - Designate*